US012773676B2

(12) United States Patent
Gipson et al.

(10) Patent No.: US 12,773,676 B2
(45) Date of Patent: Oct. 27, 2026

(54) BORON OXIDE-CONTAINING ADSORBENT AND RELATED METHODS AND DEVICES

(71) Applicant: ENTEGRIS, INC., Billerica, MA (US)

(72) Inventors: Rocky Gipson, Arroyo Grande, CA (US); Alexandra Grishchenko, Oak Park, CA (US); David Sanches, Hampton, VA (US)

(73) Assignee: ENTEGRIS, INC., Billerica, MA (US)

(*) Notice: Subject to any disclaimer, the term of this patent is extended or adjusted under 35 U.S.C. 154(b) by 992 days.

(21) Appl. No.: 17/972,094

(22) Filed: Oct. 24, 2022

(65) Prior Publication Data

US 2023/0126756 A1 Apr. 27, 2023

Related U.S. Application Data

(60) Provisional application No. 63/272,227, filed on Oct. 27, 2021.

(51) Int. Cl.
*B01J 20/20* (2006.01)
*B01D 53/04* (2006.01)
(Continued)

(52) U.S. Cl.
CPC .............. *B01J 20/20* (2013.01); *B01D 53/04* (2013.01); *B01D 53/261* (2013.01); *B01D 53/28* (2013.01); *B01J 20/28004* (2013.01); *B01J 20/28016* (2013.01); *B01J 20/28042* (2013.01); *B01J 20/28061* (2013.01); *B01J 20/28064* (2013.01);
(Continued)

(58) Field of Classification Search
CPC .................. B01J 20/20; B01J 20/28004; B01J 20/28016; B01J 20/28042; B01J 20/28061; B01J 20/28064; B01J 20/3204; B01J 20/3225; B01J 20/3234; B01J 20/3293; B01J 20/3078; B01J 20/3236; B01J 20/06; B01D 53/04; B01D 53/261; B01D 53/28; B01D 2253/102; B01D 2253/1124; B01D 2253/25; B01D 2253/304; B01D 2253/306; B01D 2253/342; B01D 2256/26; B01D 2257/2064; B01D 2257/80; B01D 53/02; B01D 53/0407; Y02C 20/30
See application file for complete search history.

(56) References Cited

U.S. PATENT DOCUMENTS

| | | | |
|---|---|---|---|
| 5,424,052 A | 6/1995 | Jacobs et al. |
| 5,447,557 A | 9/1995 | Golden |

(Continued)

FOREIGN PATENT DOCUMENTS

| | | |
|---|---|---|
| CN | 1236661 A | 12/1999 |
| CN | 101318090 A | 12/2008 |

(Continued)

OTHER PUBLICATIONS

Database WPI, Week 197747, Thomson Scientific, London, GB; AN 1977-83509Y, XP002821685.

(Continued)

*Primary Examiner* — Dung H Bui

(57) ABSTRACT

Described are boron oxide-containing adsorbents that include porous adsorbent base and boron oxide on surfaces of the base, as well as devices that include the boron oxide-containing adsorbent, and related methods of preparing and using the boron oxide-containing adsorbent.

11 Claims, 3 Drawing Sheets

(51) Int. Cl.
*B01D 53/26* (2006.01)
*B01D 53/28* (2006.01)
*B01J 20/28* (2006.01)
*B01J 20/32* (2006.01)

(52) U.S. Cl.
CPC ....... *B01J 20/3204* (2013.01); *B01J 20/3225* (2013.01); *B01J 20/3234* (2013.01); *B01J 20/3293* (2013.01); *B01D 2253/102* (2013.01); *B01D 2253/1124* (2013.01); *B01D 2253/25* (2013.01); *B01D 2253/304* (2013.01); *B01D 2253/306* (2013.01); *B01D 2253/342* (2013.01); *B01D 2256/26* (2013.01); *B01D 2257/2064* (2013.01); *B01D 2257/80* (2013.01)

(56) References Cited

U.S. PATENT DOCUMENTS

| | | | | |
|---|---|---|---|---|
| 6,304,367 | B1 | 10/2001 | Battilana | |
| 6,522,457 | B2 | 2/2003 | Battilana et al. | |
| 2004/0107838 | A1 | 6/2004 | Carruthers | |
| 2005/0272601 | A1 | 12/2005 | Cattaneo et al. | |
| 2008/0302246 | A1* | 12/2008 | Carruthers .............. | F17C 11/00 428/307.3 |
| 2009/0249953 | A1 | 10/2009 | Millward | |
| 2013/0305673 | A1 | 11/2013 | Zeller | |
| 2015/0111024 | A1 | 4/2015 | Tour et al. | |
| 2016/0375433 | A1 | 12/2016 | Tsai et al. | |
| 2020/0206715 | A1* | 7/2020 | Petit ..................... | B01J 20/0259 |

FOREIGN PATENT DOCUMENTS

| | | | |
|---|---|---|---|
| JP | S50131891 | A | 10/1975 |
| JP | S5939180 | B2 | 9/1984 |
| JP | H03242310 | A | 10/1991 |
| JP | 2902032 | B2 | 6/1999 |
| JP | 2001322872 | A | 11/2001 |
| JP | 2009219998 | A | 10/2009 |
| WO | 2008131642 | A1 | 11/2008 |

OTHER PUBLICATIONS

Dong-Fang, Qu et al., "Synthesis of Nano B2O3/TiO2 Composite and Its Application in Separation and Preconcentration of Trace Silver", Journal of Instrumental Analysis, vol. 30, No. 11, Nov. 2011, pp. 1262-1266.

* cited by examiner

BORON OXIDE-CONTAINING ADSORBENT AND RELATED METHODS AND DEVICES

CROSS-REFERENCE TO RELATED APPLICATIONS

This application claims the benefit under 35 USC 119 of U.S. Provisional Patent Application No. 63/272,227, filed Oct. 27, 2021, the disclosure of which is hereby incorporated herein by reference in its entirety.

FIELD

The present description relates to boron oxide-containing adsorbent that includes a porous adsorbent base, and boron oxide on surfaces of the base, as well as devices that include the boron oxide-containing adsorbent, and related methods of preparing and using the boron oxide-containing adsorbent.

BACKGROUND

The semiconductor manufacturing industry uses raw material gases for processing semiconductor wafers and for manufacturing microelectronic devices. These gases include halogens, hydrides, hydrogen halides, and other halogen-containing and non-halogen-containing gases.

The raw material gases must be used in highly pure form. Impurities in a raw material gas will create defects in a semiconductor wafer or microelectronic device that is processed using the raw material gas. With advanced microelectronic devices being made to smaller and smaller dimensions, the sensitivity of devices to the presence of impurities continues to increase, and raw material gases must be delivered to semiconductor processing tools with ever-lower levels of impurities.

Steps of synthesizing, isolating, purifying, handling, storing, transporting, and delivering raw material gases to a semiconductor processing tool are performed using highly contaminant-free conditions. Specialized storage and delivery systems have been developed to store and handle raw material gases, and deliver the gases to semiconductor processing tools without allowing atmospheric contaminants to become included in the gas.

But even with high levels of precaution, small amounts of impurities are typically present in a purified gas, from atmospheric or non-atmospheric sources. Impurities may be present not only from exposure to atmospheric impurities, but also potentially may be generated within a gas handling or storage system. Impurities may be generated during handling or storage of a raw material gas by interactions between the raw material gas and the handling or storage equipment. Impurities may also be generated by interactions between the gas and a different impurity in the system, e.g., water. Because many raw material gases are very reactive (including halogens, hydrides, and hydrogen halides), impurities may be generated during storage by the reactive raw material gas interacting chemically with a contaminant such as water, or with a metal portion of a storage or gas handling system such as a metal flow control device (pipe or conduit), vessel body, valve, etc.

Specific contaminants that may be present in a raw material gas at a point-of-use, meaning at a point of delivery of the gas to a semiconductor processing tool, include water, metals, and hydrocarbons. Possible metal contaminants include elemental metals that are present in metal storage vessels or metal conduits that are used to contain, move, or handle a reagent gas, and include e.g., copper, molybdenum, nickel, iron, or cobalt. In the specific case of hydrogen chloride (HCl) gas, the hydrocarbon 2-chloropropane can be present and is known to cause on-wafer defects. These contaminants can produce defects in a processed microelectronic device even if the contaminant is present in only a trace amount, e.g., at a concentration in a range of parts per billion (volume) or lower.

Suppliers and users of raw material gases have ongoing need to reduce or eliminate trace impurities (e.g., metals, water, hydrocarbons) that are found in raw material gases supplied to semiconductor processing tools, at a point of use, i.e., at the tool. "Gas purifier" products have been developed and are commercially available to improve final purity (i.e., purity as delivered to a semiconductor processing tool) of a gaseous raw material as the gas is supplied to a tool. Examples include a line of products sold by Entegris under the trade name GateKeeper® GPU Media Gas Purifiers. These products are useful for performing a final purification step on raw material gases that include halides, hydrides, hydrogen halides, and others, e.g.: HCl, $Cl_2$, $B_2H_6$, $BCl_3$, $CClH_3$, $GeCl_4$, $GeH_4$, $H_2S$, $H_2Se$, HBr, $NF_3$, $SiCl_4$, $SiF_4$, $SiH_2Cl_2$, $SiHCl_3$, $SO_2$, $CHClF_2$, $BF_3$, HF, and HBr. Impurities that can be removed using these gas purifiers include trace amounts of water, hydrocarbons (e.g., toluene) and metals such as Fe, Ni, Mo, Cr, and Mn, among others.

SUMMARY

The following description relates to new adsorbent materials (or "purification materials") for use in methods of adsorbing impurity gases that are present in a highly pure reagent gas. The new adsorbent materials include a porous adsorbent base structure (e.g., particles or a "monolith"), and boron oxide on surfaces of the porous adsorbent base. The new adsorbent materials are referred to herein as "boron oxide-containing adsorbent," e.g., "boron oxide-containing particles," or for certain example adsorbent in the form of particles, merely "the particles" or "the adsorbent particles" where allowed by context.

The new adsorbent materials include an effective combination of a porous base structure (sometimes referred to as simply a "base"), which may be effective as an adsorbent material on its own, but with boron oxide added to surfaces of the base structure to provided added adsorption properties. In particular, the new adsorbent materials are effective in adsorbing trace amounts of moisture, metals, hydrocarbons, or a combination of these, that are present in otherwise pure raw material gases such as halides, hydrides, and hydrogen halides.

Particularly preferred boron oxide-containing adsorbent can be prepared using a carbon-based adsorbent material as a base material, e.g., activated carbon or pyrolyzed carbon, in the form of porous adsorbent particles or monolith. Activated carbon and pyrolyzed carbon can function as a very effective base material for adsorbing impurity gas molecules due to the high surface area and high porosity of a variety of activated carbon and pyrolyzed carbon products. The highly inert, hygroscopic nature of a boron oxide ($B_2O_3$) added to a carbon base produces a very effective boron oxide-containing adsorbent for adsorbing gaseous impurities that include water, gaseous metals, and hydrocarbons.

In one aspect, the disclosure relates to boron oxide-containing adsorbent that includes: porous adsorbent base, and boron oxide at surfaces of the porous adsorbent base.

In another aspect, the invention relates to a purifier device that includes a purifier vessel having an interior, an inlet, an outlet, and boron oxide-containing adsorbent as described, at the interior.

In another aspect, the disclosure relates to a method of forming boron oxide at surfaces of porous adsorbent base. The method includes: applying aqueous boric acid solution to surfaces of porous adsorbent base, removing water from the boric acid solution, and forming boron oxide at the surfaces from the boric acid.

In yet another aspect, the disclosure relates to a method of forming porous adsorbent base having surfaces coated with boric acid solution. The method includes applying aqueous boric acid solution to surfaces of porous adsorbent base.

In another aspect, the disclosure relates to a method of removing impurity from a reagent gas. The method includes contacting the reagent gas with boron oxide-containing adsorbent that includes porous adsorbent base, and boron oxide at surfaces of the porous adsorbent base.

Figure 1:
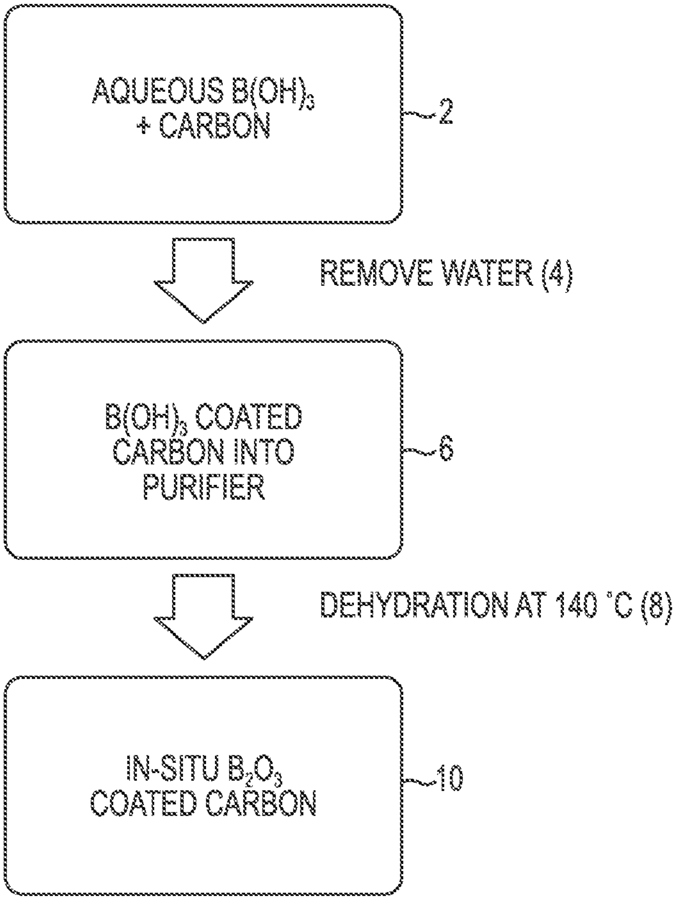
FIG. 1 shows examples of steps of preparing the adsorbent as described.

The figures are schematic and not necessarily to scale.

DETAILED DESCRIPTION

The following is a description of novel boron oxide-containing adsorbent materials that include porous adsorbent base (e.g., base particles or monolith) that includes porous surfaces, and boron oxide that is located at surfaces of the porous adsorbent base. Also described are methods for preparing the novel adsorbent material (e.g., particles or monolith), methods of using the novel adsorbent material, and systems and devices such as purifier devices and semiconductor processing tools that include the novel adsorbent material.

The novel adsorbent material is in the form of a porous adsorbent base structure that can be used as a porous substrate to support boron oxide at surfaces of the base structure in a manner that allows the boron oxide to be effective as an adsorbent or purifier for removing gaseous impurities from a gas. In certain examples, the porous adsorbent base may be in the form of individual porous particles (e.g., "inner particles," "core particles," or "base particles") that can be used as a porous substrate to support boron oxide at surfaces of the particles, in a manner that allows the boron oxide to be effective as an adsorbent or purifier for removing gaseous impurities from a gas. The base may be small, granular particles, or in other examples the base may be a larger-dimensioned "monolith" or "puck" that can be used as a porous substrate to support boron oxide at surfaces of the particles in a manner that allows the boron oxide to be effective as an adsorbent or purifier for removing gaseous impurities from a gas.

The boron oxide-containing adsorbent as described is not intended to include boron oxide granules, meaning granules (or particles, or monolithic structures) that are made of only boron oxide. Boron oxide granules, meaning granules that contain substantially only boron oxide (as compared to boron oxide-containing adsorbent of the present description, which includes boron oxide formed on surfaces of a different (non-boron oxide) type of porous adsorbent base), are known for use in purifier products, e.g., as sold by Entegris as the "CR Series" of GateKeeper® GPU Media Gas Purifiers.

Boron oxide-containing adsorbent as described herein, including boron-oxide-containing adsorbent particles, are different from boron oxide granules at least because the presently-described boron oxide-containing adsorbent includes a porous base structure (particle or "monolith") that may be different from boron oxide and may have physical properties that are different from those of boron oxide granules, e.g., may have a higher porosity and higher surface area compared to boron oxide granules; and also because boron oxide at surfaces of the presently-described boron oxide-containing adsorbent is separately-added to the surfaces of a porous adsorbent base structure, i.e., is applied to surfaces of a porous adsorbent base after the base has been formed using a separate (previous) formation step.

The porous adsorbent base may be any useful porous adsorbent material onto which an amount of boron oxide may be formed by a method as described, after which the porous adsorbent base and the applied boron oxide will be effective as a purifier or adsorbent material to remove a gas impurity from a reagent gas such as a halide, hydride, or a hydrogen halide.

Examples of adsorbent materials that may be useful as a porous adsorbent base include known types of porous adsorbent materials. Examples include carbon-based adsorption media, polymeric adsorption media, silica, etc. Specific examples include metal organic frameworks ("MOF"), which include zeolitic materials, specifically including zeolitic imidazolate framework ("ZIF") adsorbents; silica and silica-based particles; alumina and alumina-based particles; and porous carbon adsorbent particles (sometimes referred to as "porous carbon particles" for short), which include carbon adsorbent materials commonly referred to as "activated carbon particles" among other types of carbon particles.

Non-limiting examples of porous carbon adsorbent materials that are useful as a porous adsorbent base include: carbon formed by pyrolysis of synthetic polymer such as a hydrocarbon, halocarbon (e.g., chlorocarbons), or hydrohalocarbon resin e.g., polyacrylonitrile, polystyrene, sulfonated polystryrene-divinylbenzene, polyvinylidene chloride (PVDC), etc.; polymer framework (PF) materials; porous organic polymers (POP); cellulosic char; charcoal; and activated carbon formed from natural source materials such as coconut shells, pitch, wood, petroleum, coal, etc.

A porous adsorbent base may be in any shape, form, size, etc., to support the boron oxide at surfaces of the base, with the combination structure of the base with the added boron oxide being effective for the combination base and boron oxide to be useful in adsorbing impurity gases from a reagent gas that contains the impurity. The size, shape, and physical properties of a porous adsorbent base, such as pore features (pore size, porosity), can affect the capacity of the base, after boron oxide is applied to surfaces of the base, to adsorb impurities from a reagent gas that contains the impurities, as well as the packing density and void (interstitial space) volume of the adsorbent when contained in a purifier device.

The base (prior to having boron oxide formed at surfaces of the base) may have any suitable form, such as a granule or a structure referred to as a "monolith." Granules, also referred to as "particles," are a collection of many individual pieces of porous adsorbent, each piece having a relatively small size, such as less than 3 centimeter, or less than 2 or 1 centimeter. The particles may have any useful particle size, shape, porosity, and range of particle sizes. Examples of useful shapes and forms of a base structure include beads, granules, pellets, tablets, shells, saddles, powders, irregularly-shaped particulates, pressed monoliths, extrudates of any shape and size, cloth or web form materials, honeycomb matrix monolith, and composites (of the adsorbent with other components), as well as comminuted or crushed forms of the foregoing types of adsorbent materials.

Useful or preferred base particles can have an average size that is in a range from 0.5 to 20 millimeters, such as from 1 to 15 or from 1 to 10 millimeters (mm). Average particle size for a collection of adsorbent particles can be measured by standard techniques, including random selection of particles from a collection of particles and measuring size (e.g., diameter) by use of a micrometer.

Useful or preferred particles can also have a shape that in combination with the average size of the particles will produce a useful packing density and amount of void space between particles when the particles are included in a purifier device. Example shapes include rounded shapes, including particles that are substantially rounded, substantially spherical, or cylindrical. Examples of preferred amounts of void space (not including headspace of a vessel) between adsorbent particles when the particles are contained as adsorbent particles of a purifier device (see FIGS. 2 and 3) may be below 50 percent, e.g., below 40, 30, or 25 percent.

As alternatives to a porous adsorbent base in the form of particles of relatively small size, e.g., having dimensions of less than 2 centimeters, a porous adsorbent base may instead be larger in size, with fewer adsorbent structures being contained in a purifier. In the adsorbent art, adsorbent structures that are larger in dimension or that are sized to fit closely to an interior space of a storage vessel may sometimes be referred to as "monolith"-type adsorbent materials. A monolith adsorbent has at least one dimension that is greater than 2 centimeters, and may be in the form of a three-dimensional cylinder or "puck." Typically, one single monolith or a small number (e.g., from 3 to 10) of monoliths are sized to fit into a vessel of a purifier.

Another feature of a useful porous adsorbent base (e.g., in the form of particles or as a monolith) is a high surface area. A porous adsorbent base, such as porous adsorbent carbon particles, can be characterized by surface area of the porous adsorbent material. This type of surface area measurement can be performed by known methods nitrogen BET surface area measurement, for example by using an Autosorb iQ instrument available from Anton-Paar with the instrument set to use the BET (Brunauer, Emmett and Teller) method. According to useful or preferred examples, a porous adsorbent base material can exhibit a relatively high surface area, such as a surface area of at least 500, 600, or 700 square meters per gram, e.g., a surface area in a range from 700 to 1000 square meters per gram, or higher.

The porous adsorbent base can be porous, and may contain an interconnected network of pores that extend through interiors of the base structure. The pores may have any useful pore size, meaning any pore size that will allow for desired adsorption performance of the base after boron oxide is formed on surfaces of the base.

Pore sizes of adsorbent materials are classified in general ranges based on average pore sizes of a collection of particles. Particles that have an average pore size of greater than 50 nanometers (nm) are typically referred to as macroporous. Particles that have an average pore size in a range from 2 to 50 nanometers (nm) are typically referred to as mesoporous particles. Particles that have an average pore size of less than 2 nanometers are typically referred to as microporous. These terms are defined by IUPAC terminology. Base particles as used according to the present description may have average pore sizes, or pore size ranges, that fall within any of these size range designations.

A porous adsorbent base may have pores in a macroporous range, pores in a mesoporous range, and pores in a microporous range. Desirably, for useful removal of impurities as described herein a base can have a useful amount of pores of a microporous range and also a useful amount of pores in a mesoporous range. Impurities have a faster rate of mass transfer within pores of a microporous or mesoporous size range, compared to a rate of mass transfer within pores of a macroporous size range; for this reason (at least), a porous adsorbent base can preferably have a significant pore size distribution of pores in the microporous size range, the mesoporous size range, or both.

Another property of a porous adsorbent base material is porosity (also sometimes referred to as "pore volume"), which is an amount (volume) of porous adsorbent base that is taken up by pores, per mass of a collection of particles. Example base particles can have a porosity of at least 0.2 milliliters per gram, such as a porosity of at least 0.35 milliliters per gram, preferably at least 0.40 milliliters per gram.

Useful or preferred porous adsorbent base materials include porous carbon adsorbent particles, such as particles of activated carbon and pyrolyzed carbon. Activated carbon is a granular material produced by steps that include heating charcoal that is derived from a natural source (e.g., coconut shells or coal) to a temperature in a range of from 800 to 1000 degrees Celsius to "activate" the material. After heating, impurities are removed from the material by acid washing. Commonly, activated carbon may have pore sizes ranging from 500 to 1000 nm and a surface area of at least about 1000 square meters per gram.

Useful activated carbon particles may be of any effective size and shape, with typical forms being substantially rounded, spherical small beads, pellets, or granules. Preferred activated carbon particles can have good adsorption properties for various gases, even before boron oxide is formed on the particle surfaces as described herein. Preferred particles can have relatively high porosity (e.g., at least 35 or 40 cubic centimeters per gram) and relatively high surface area (e.g., at least 400, 500, 600, or 700 square meters per gram).

Many varieties of activated carbon particles, prepared from a range of carbon sources, are well known and many are commercially available. Examples include bead-shaped activated carbon products sold by Kureha Corporation of Japan.

According to the methods of the present description, boron oxide ($B_2O_3$) is formed on surfaces of the porous adsorbent base. It is not an effective option to apply boron oxide onto an adsorbent porous base surface directly, as boron oxide, because boron oxide is reactive with protic solvents such as water, and exhibits poor solubility in other organic solvents. To overcome this difficulty in working with boron oxide in its boron oxide form, to avoid the need to apply boron oxide directly onto porous adsorbent base surfaces, the present description includes methods of forming boron oxide on surfaces of porous adsorbent base by applying a boric acid (ortho-, or meta-boric acid) solution to the base surfaces and then removing solvent (e.g., water) from the applied boric acid solution, which results in the chemical formation of boron oxide at the surfaces, and which can remain at the surfaces.

Boron oxide is a known chemical material, and can be formed from boric acid according to the reaction:

$$2H_3BO_3 \rightarrow B_2O_3 + 3H_2O \quad (I)$$

This reaction is well known and is described, for example, in "Inorganic Syntheses," by W. Conard Fernelius, vol. II, McGraw-Hill, 1946, pages 22-23; see also U.S. Pat. No. 6,522,457, the entire contents of which is incorporated herein by reference. Although the starting ingredient is identified as orthoboric acid, $H_3BO_3$, an intermediate reaction product, metaboric acid, $HBO_2$, also works well as the starting ingredient. Hereinafter, reference to boric acid is meant to refer to both orthoboric and metaboric acid unless otherwise stated.

To form boron oxide on surfaces of the adsorbent base (e.g., particles monolith) as described, a boric acid solution is prepared and is applied to the adsorbent base surfaces. The manner used to apply the solution to the adsorbent base surfaces may be any useful method of application, such as spraying or otherwise coating the solution onto the base particles, or alternately by dipping or submerging the base into the solution. After applying the boric acid solution to the surfaces, the solvent (e.g., incipient water) is removed from the solution to leave boric acid, $B(OH)_3$, at the surface.

The base and the boric acid coating on the base surfaces are substantially dry of moisture (i.e., liquid water) present in the applied boric acid solution. But, molecular water remains in the boric acid that is present at the base surfaces. To remove the water from the boric acid, and to chemically convert the boric acid to boron oxide, the base that contains the boric acid (from the dried boric acid solution) at surfaces is further heated for a time and at a temperature effective to remove the water from the boric acid and to thereby convert the boric acid to boron oxide, $B_2O_3$. This step is sometimes referred to as a "dehydrating" step. The resultant boron oxide forms a highly conformal coating on the surfaces of the pores of the porous adsorbent base. The boric acid solution can contain boric acid in any solvent, with water being an effective solvent. The concentration of boric acid in the solution can be any concentration that will be effective to apply a desired amount of boric acid onto the adsorbent base surfaces, for forming a desired amount of boron oxide on the surfaces. Examples of useful concentrations of boric acid (whether orthoboric acid or metaboric acid) may be in a range from 0.1 to 10 M. Because water is an effective solvent for boric acid, solvent used to form boron oxide on surfaces of base will be referred to as water, as an exemplary solvent.

After applying the boric acid solution to the base surfaces, water is removed from the solution in a manner that causes the boric acid to be chemically converted to boron oxide according to Equation I, with the boron oxide remaining at surfaces of the porous adsorbent base in a desired amount. Converting the boric acid to boron oxide involves removing water from the solution and applying heat in an amount that is also sufficient produce boron oxide per Equation I.

The manner of removing water and heating the solution to form the boron oxide can be any effective method. Examples of useful equipment may be heaters, ovens, rotary evaporators, ovens with radiative or convective heat and optional agitation, etc. A dehydrating step to convert applied boric acid to boron oxide can preferably be performed in a highly-pure, substantially-contaminant-free dry atmosphere, optionally in the presence of an inert gas such as nitrogen, helium, or the like.

Forming boron oxide according to the reaction of Equation I does not require that all or substantially all of the water from the boric acid solution be removed from the solution or from boron oxide reaction product at surfaces of the porous adsorbent base. However, a method of the present description can preferably include heating a boron oxide reaction product at a temperature and for an amount of time that will be useful to remove substantially an entire amount of water from boron oxide reaction product that is formed on a porous adsorbent base; this step of removing residual water from boron oxide reaction product may be referred to as a "dehydrating" step. A useful temperature for removing residual water from the boron oxide reaction product, i.e., for dehydration of the porous adsorbent base that contain boron oxide, may be at least 120 degrees Celsius, e.g., a temperature in a range from 130 or 150 degrees Celsius, up to about 200 degrees Celsius.

The amount of water that remains present in the boron-oxide containing adsorbent (e.g., particles or monolith) after forming the boron oxide, and after a dehydration step, may be an amount that is less than 0.5 weight percent water per total weight boron oxide-containing adsorbent, such as less than 0.1 weight percent water per total weight boron oxide-containing adsorbent.

The amount of boron oxide that is applied to the adsorbent base can be an amount that will produce boron oxide-containing adsorbents that are effective as an adsorbent to remove impurities from a reagent gas that contains impurities, e.g., by adsorbing the impurities. The amount should be sufficient to provide effective adsorption properties of the boron oxide-containing adsorbent, while not unduly interfering with porosity of the porous adsorbent base, i.e., without unduly filling in pores, particularly pores in the mesoporous or microporous size ranges, below 10 or 2 nanometers. Currently recognized examples of useful amounts of boron oxide can be at least 2 weight percent boron oxide per gram boron oxide-containing adsorbent, such as an amount in a range from 5 to 30 weight percent boron oxide per gram boron oxide-containing adsorbent.

Properties of the porous adsorbent base, upon having the boron oxide applied to surfaces of a porous adsorbent base, are not unduly affected by the presence of the added boron oxide formed on the base surfaces. In specific, physical features of the boron oxide-containing adsorbent, i.e., the porous adsorbent base with boron oxide formed on surfaces thereof, may be comparable to the physical features of the base particles before the boron oxide is applied to the surfaces.

Useful or preferred boron oxide-containing adsorbent can have a shape that is comparable to the shape of the adsorbent base.

When the base adsorbent is made from particles, the boron oxide-containing adsorbent particles will exhibit a void space (not including headspace of a vessel) between adsorbent particles, when included as adsorbent particles of a purifier device (see FIG. 2 or 3), that is comparable to that of the void space of base particles, e.g., below 50 percent, e.g., below 40, 30, or 25 percent.

The boron oxide-containing adsorbent can exhibit a relatively high surface area, which is comparable to the surface area of porous adsorbent base from which the boron oxide-containing adsorbent is formed, such as a surface area of at least 400, 500, 600, or 700 square meters per gram, e.g., a surface area in a range of at least 400, 500, 700 or up to or greater than 1000 square meters per gram.

The boron oxide-containing adsorbent, like the porous adsorbent base, is preferably porous and can contain an interconnected network of pores that extend throughout the interior of the base structure. The pores have any useful pore size and pore size distribution, meaning any pore size that will allow for desired adsorption of impurities on the boron oxide-containing adsorbent.

Pore sizes of the boron oxide-containing adsorbent may be comparable to the pore sizes of porous adsorbent base used to form the boron oxide-containing adsorbent, before the boron oxide is formed at surfaces of the porous adsorbent base. The boron oxide-containing adsorbent may have an average pore size of greater than 50 nanometers (nm) (e.g., may be macroporous particles); may have an average pore size in a range from 2 to 50 nanometers (nm) (e.g., may be mesoporous particles); or may have an average pore size of less than 2 nanometers (e.g., may be microporous). Desirably, boron oxide-containing porous adsorbent can have a significant pore size distribution of pores in the microporous size range, the mesoporous size range, or both.

Porosity of the boron oxide-containing adsorbent particles may be comparable to the porosity of the base particles, before the boron oxide is formed at surfaces of the base particles. Example boron oxide-containing adsorbent particles can have a porosity of at least 0.2 to 0.8 milliliters per gram.

FIG. 1 shows example steps of a process of forming boron oxide on base particles (alternately, monolithic porous adsorbent base), such as activated carbon particles. At step 2, an aqueous solution of boric acid is applied to base particles, which may be carbon adsorbent particles, e.g., activated carbon particles, pyrolyzed carbon, or the like. By any useful technique, an amount of water may be removed from the aqueous solution that is disposed on the particle surfaces, and the aqueous solution and base particles may be exposed to elevated temperature to cause the formation of boric acid. This initial water removal step may be performed using any useful equipment and techniques, such as by use of an oven, reduced pressure, or a rotary evaporator.

The particles, which contain surfaces having a coating of boric acid, can be further dried by any useful method to convert the boric acid to boron oxide. As illustrated at FIG. 1, the particles can be first placed at an interior of a vessel of a purifier device (see FIGS. 2 and 3, and related descriptions, herein), and the purifier device and the contained particles can be heated in an oven at a temperature of 140 degrees Celsius for a time sufficient to remove most of the remaining water from the particles, e.g., to reduce the water content of the boron oxide-containing adsorbent particles to below about 2 weight percent or below 1 or 0.5 weight percent, based on total weight boron oxide-containing adsorbent particles. The result is a purifier device vessel that contains the boron oxide-containing adsorbent particles that have been dehydrated while in the purifier device, i.e., in-situ.

Boron oxide-containing adsorbent as described can be used for removing one or more impurity gases from a reagent gas that contains the one or more impurity gases, by the reagent gas and impurity gas contacting the boron oxide-containing adsorbent. The impurity gas becoming adsorbed on the boron oxide-containing adsorbent, while the reagent gas does not become adsorbed, and the impurity is removed from the reagent gas, which is processed to a more highly pure form with a reduced level of the removed impurity.

A process of purifying a reagent gas by removing impurities from the reagent gas, i.e., removing trace-level contaminants, requires that when the reagent gas contacts the boron oxide-containing adsorbent, the contaminant (i.e., impurity) becomes effectively adsorbed onto surfaces of the boron oxide-containing adsorbent, while the reagent gas does not become adsorbed The reagent gas will not itself become effectively adsorbed onto surfaces of the boron oxide-containing adsorbent as the reagent gas contacts the particles at processing conditions, i.e., conditions of purifying the reagent gas. Examples of reagent gases that do not become substantially adsorbed on boron oxide-containing adsorbent as described include halides, hydrides, and hydrogen halides, such as HCl, $Cl_2$, $B_2H_6$, $BCl_3$, $CClH_3$, $GeCl_4$, $GeH_4$, $H_2S$, $H_2S_3$, $NF_3$, $SiCl_4$, $SiF_4$, $SiH_2Cl_2$, $SiHCl_3$, $SO_2$, $CHClF_2$, $BF_3$, and HBr.

An impurity gas that may be removed from the reagent gas is an impurity gas that will become effectively adsorbed onto surfaces of the boron oxide-containing adsorbent particles, as the reagent gas (with impurities) contacts the boron oxide-containing adsorbent particles at processing conditions, i.e., conditions of purifying a reagent gas. Examples of impurities that can be adsorbed onto these particles include water, metals (e.g., copper, molybdenum, nickel, iron, or cobalt), and hydrocarbons such as 2-chloropropane and toluene. In use, when using the boron oxide-containing adsorbent particles in a method of purifying a reagent gas, the particles can be contained in an interior of a vessel (a "purifier" vessel) that includes a vessel body that defines an interior volume, an inlet (conduit, passage, opening, etc.) that leads from an exterior to the interior, an outlet (conduit, passage, opening, etc.) that leads from the interior to an exterior, and a collection of the boron oxide-containing adsorbent particles at the interior.

Figure 2:
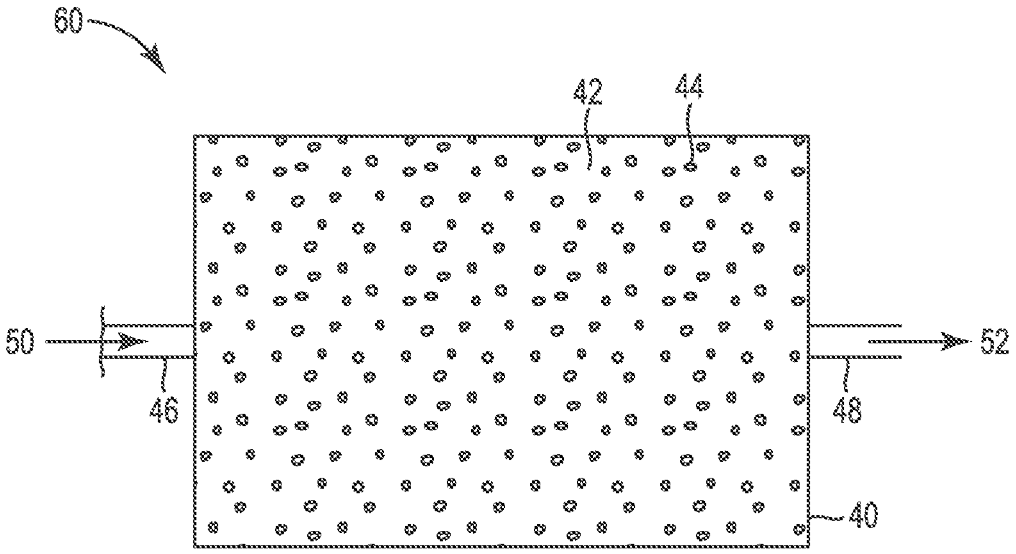
FIG. 2 shows a purifier device as described.

As shown at FIG. 2, example purifier device 60 includes vessel body 40, which defines interior 42, and which contains a collection of boron oxide-containing adsorbent particles 44 (alternately, monolithic boron oxide-containing adsorbent). Vessel body 40 can be made of materials that are chemically resistant to reagent gas that will be passed through body 40 during use of device 60 in a purification process. Examples of useful materials include stainless steel, nickel alloys, and Hastelloy metal alloys. A useful or preferred interior surface of the vessel may also be made smooth by polishing or electropolishing, for example to a roughness of 20 Ra or 10 Ra.

Still referring to FIG. 2, inlet 46 allows reagent gas 50 to flow into interior 42. Reagent gas 50 may be any reagent gas that contains impurities, e.g., at trace levels, that can become adsorbed onto particles 44, while the reagent gas passes through interior 42 and then exits interior 42 through outlet 52 while containing a reduced amount of the impurities. The impurities remain adsorbed on particles 44 and a purified reagent gas 52 passes through outlet 48.

Figure 3:
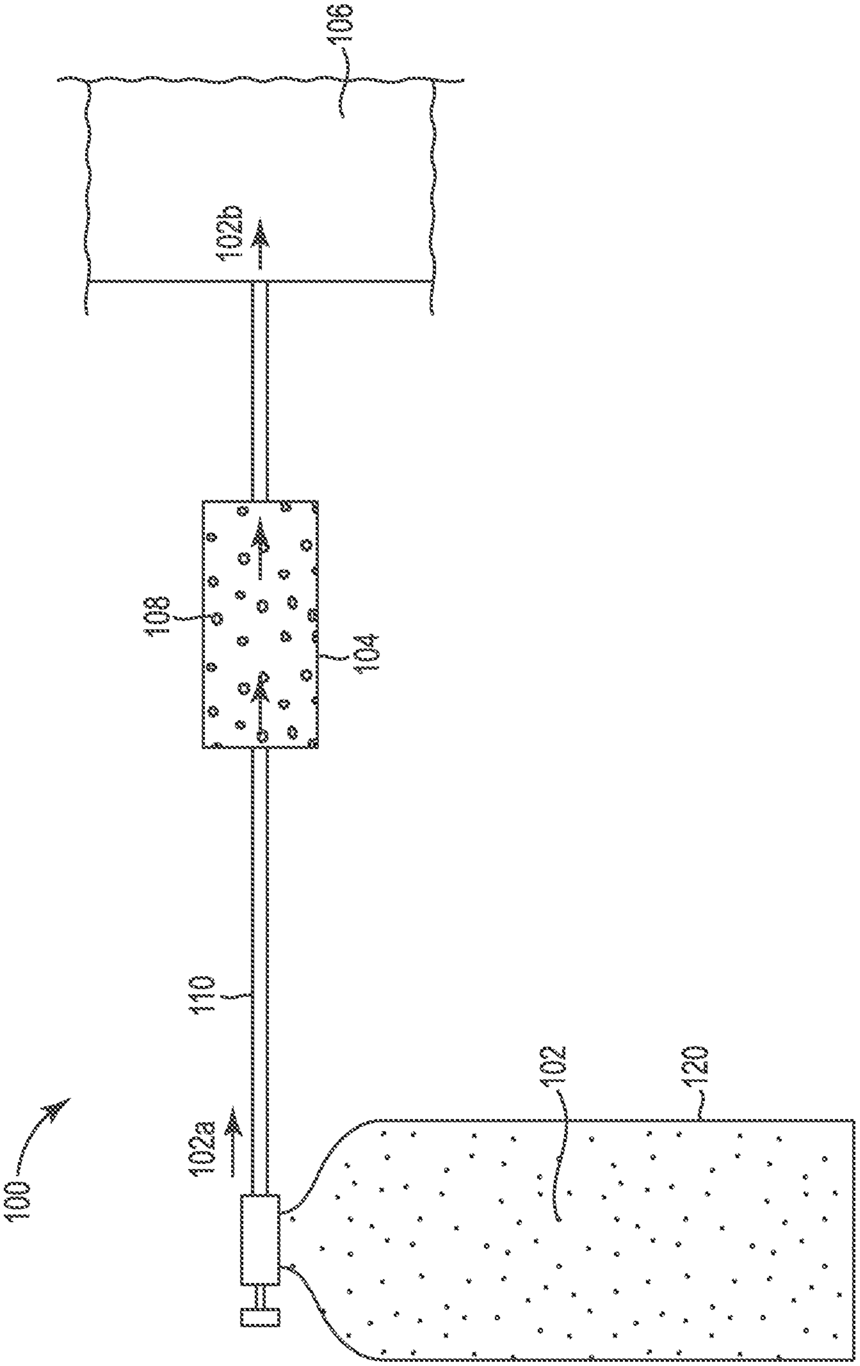
FIG. 3 shows a system of using a purifier device as described in a final purification step of a reagent gas being delivered to a semiconductor processing tool.

FIG. 3 illustrates a semiconductor processing system 100, which includes stored reagent gas 102 (including trace levels of impurities), purifier 104, which contains boron oxide-containing adsorbent particles 108, and semiconductor processing tool 106. Vessel 120 may be any storage vessel or other type of a source of reagent gas 102. Vessel 120 may be a pressurized or non-pressurized (e.g., adsorbent-containing) storage vessel that can be used to transport and store reagent gas 102, and then be connected to tool 106 to deliver reagent gas 102 to tool 106 for processing. Vessel 120 may alternately be a permanent or semi-permanent vessel contained in a clean room along with tool 106, or that is a component of tool 106.

Vessel 120 contains reagent gas 102 in a highly purified form for use in tool 106. Gas 102 may be any reagent gas, e.g., a halogen, hydride, or hydrogen halide, that is highly pure, such as at least 99.9 or 99.99 percent pure by volume.

Gas 102 may contain trace levels of impurities such as: water in an amount of below 100 ppbv, one or more metals in an amount of below 100 ppbv (of total metals), and hydrocarbons in an amount of below 100 ppbv (total hydrocarbons).

According to the present description, gas 102 may be passed through purification device 104 and particles 108 for a "final filtration step" or a "final purification step," to remove an amount of trace impurities from gas 102 before delivering a purified form of gas 102*a* to tool 106. Gas 102*a* will include a reduced amount of one or more trace impurities compared to stored gas 102, e.g., a reduced amount of water, hydrocarbon, or metal impurities. The reduced amount of any single impurity (water, hydrocarbons or a single hydrocarbon species, metals or a single metal species) present in purified gas 102*a* may be an amount that is reduced by at least 20, 40, 50, or 60 percent (molar) relative to the amount of the single impurity present in stored gas 102.

In a particular example, reagent gas 102 may be hydrogen fluoride (HF), at a purity of at least 99.99 percent (volume), which contains water as an impurity in an amount of less than 100 ppbv. Reagent gas 102*a* delivered to tool 106, after being purified by being passed through purifier 104 to contact particles 108, will have a reduced amount of water compared to stored reagent gas 102 in vessel 120. Tool 106 may be a HF furnace, an etching tool, a cleaning tool, or another tool that uses hydrogen fluoride. In a different example, reagent gas 102 may be hydrogen chloride gas (HCl), at a purity of at least 99.99 percent (volume), which contains 2-chloropropane as an impurity in an amount of less than 100 ppbv. Reagent gas 102*a* delivered to tool 106, after being purified by being passed through purifier 104 to contact particles 108, will have a reduced amount of 2-chloropropane compared to stored reagent gas 102 in vessel 120. Tool 106 may be an etching tool or an epitaxy tool.

In a first aspect, a boron oxide-containing adsorbent comprises a porous adsorbent base, and boron oxide at surfaces of the porous adsorbent base.

In a second aspect according to the first aspect, the porous adsorbent base comprises porous adsorbent carbon particles.

In a third aspect according to the second aspect, the porous adsorbent carbon particles being derived from a natural carbon source or from synthetic hydrocarbon polymer.

A fourth aspect according to any preceding aspect further comprising: from 70 to 95 weight percent porous adsorbent base, and from 5 to 30 weight percent boron oxide, based on total weight porous adsorbent base and boron oxide.

In a fifth aspect according to any preceding aspect, the adsorbent consists essentially of porous adsorbent base and boron oxide.

A sixth aspect according to any preceding aspect, having a surface area of at least 500 square meters per gram.

In a seventh aspect according to any preceding aspect, the porous adsorbent base comprising particles having an average diameter of less than 1 centimeter.

In an eighth aspect according to any preceding aspect, the porous adsorbent base comprising a monolith having a dimension of at least 2 centimeters.

A ninth aspect further comprising less than 1 weight percent water based on total weight boron oxide-containing adsorbent.

In a tenth aspect according to any preceding aspect, the adsorbent is prepared by a method that comprises: applying aqueous boric acid solution to surfaces of porous adsorbent base, removing water from the boric acid solution, and forming boron oxide at the surfaces from the boric acid.

In an eleventh aspect according to the tenth aspect, the method further comprises removing an amount water from the boric acid solution to leave boric acid at the surfaces, and heating the boric acid at the surface to remove water from the boric acid and convert the boric acid to boron oxide.

In a twelfth aspect a purifier device comprises a purifier vessel comprising an interior, an inlet, an outlet, and boron oxide-containing adsorbent of any of the preceding aspects at the interior.

In a thirteenth aspect, a method of forming boron oxide at surfaces of porous adsorbent base, the method comprises: applying aqueous boric acid solution to surfaces of porous adsorbent base, removing water from the boric acid solution, and forming boron oxide at the surfaces from the boric acid.

In a fourteenth aspect according to the thirteenth aspect, the porous adsorbent base comprises porous carbon adsorbent.

A fifteenth aspect according to the thirteenth or fourteenth aspect, further comprising removing water from the boric acid solution using a rotary evaporator.

A sixteenth aspect according to any of the thirteenth through fifteenth aspects, further comprises: after removing water from the boric acid solution, placing the porous adsorbent base in a vessel of a purifier device, and heating the purifier device and particles contained in the purifier device to a temperature in a range from 120 to 200 degrees Celsius, to remove water from the boric acid and convert the boric acid to boron oxide.

In a seventeenth aspect according to any of the thirteenth through sixteenth aspects, the porous adsorbent base having a surface area of at least 500 square meters per gram.

In an eighteenth aspect according to any of the thirteenth through seventeenth aspects, the aqueous boric acid solution having a boric acid concentration in a range from 0.1 to 10 mole per liter.

In a nineteenth aspect, a method of forming porous adsorbent base having surfaces coated with boric acid solution comprises applying aqueous boric acid solution to surfaces of the porous adsorbent base.

A twentieth aspect according to the nineteenth aspect, further comprises with the porous adsorbent base in a rotary evaporator, removing water from the boric acid solution.

In a twenty-first aspect according to the nineteenth or twentieth aspect, the porous adsorbent base comprises carbon particles.

In a twenty-second aspect according to any of the nineteenth through twenty-first aspects, the porous adsorbent base having a surface area of at least 500 square meters per gram.

In a twenty-third aspect, a method of removing impurity from a reagent gas comprises contacting the reagent gas with boron oxide-containing adsorbent that comprises porous adsorbent base and boron oxide at surfaces of the porous adsorbent base.

In a twenty-fourth aspect according to the twenty-third aspect, the porous adsorbent base comprises carbon particles.

In a twenty-fifth aspect according to the twenty-third or twenty-fourth aspect, the boron oxide-containing adsorbent comprises from 70 to 95 weight percent porous adsorbent base, and from 5 to 30 weight percent boron oxide, based on total weight porous adsorbent particles and boron oxide.

In a twenty-sixth aspect according to any of the twenty-third through twenty-fifth aspects, the boron oxide-containing adsorbent has a surface area of at least 500 square meters per gram.

In a twenty-seventh aspect according to any of the twenty-third through twenty-sixth aspects, the reagent gas comprising a halide, a hydride, or a hydrogen halide, the impurity comprising water, a metal, or a hydrocarbon.

In a twenty-eighth aspect according to any of the twenty-third through twenty-seventh aspects, the reagent gas comprises HCl, $Cl_2$, $B_2H_6$, $BCl_3$, $CClH_3$, $GeCl_4$, $GeH_4$, $H_2S$, $H_2S_3$, $NF_3$, $SiCl_4$, $SiF_4$, $SiH_2Cl_2$, $SiHCl_3$, $SO_2$, $CHClF_2$, $BF_3$, and HBr.

In a twenty-ninth aspect according to any of the twenty-third through twenty-seventh aspects, the reagent gas is hydrogen chloride gas (HCl) and the impurity is 2-chloropropane.

In a thirtieth aspect according to any of the twenty-third through twenty-seventh aspects, the reagent gas is hydrogen fluoride (HF) and the impurity is water.

The invention claimed is:

1. A boron oxide-containing adsorbent, comprising:
a porous adsorbent base, and
boron oxide at surfaces of the wherein the porous adsorbent base comprises porous adsorbent carbon particles.

2. The boron oxide-containing adsorbent of claim 1, the porous adsorbent carbon particles being derived from a natural carbon source or from synthetic hydrocarbon polymer.

3. The boron oxide-containing adsorbent of claim 1, further comprising:
from 70 to 95 weight percent porous adsorbent base, and
from 5 to 30 weight percent boron oxide,
based on total weight porous adsorbent base and boron oxide.

4. The boron oxide-containing adsorbent of claim 1, consisting essentially of porous adsorbent base and boron oxide.

5. The boron oxide-containing adsorbent of claim 1, having a surface area of at least 500 square meters per gram.

6. The boron oxide-containing adsorbent of claim 1, the porous adsorbent base comprising particles having an average diameter of less than 1 centimeter.

7. The boron oxide-containing adsorbent of claim 1, the porous adsorbent base comprising a monolith having a dimension of at least 2 centimeters.

8. The boron oxide-containing adsorbent of claim 1, comprising less than 1 weight percent water based on total weight boron oxide-containing adsorbent.

9. The boron oxide-containing adsorbent of claim 1, prepared by a method that comprises:
applying aqueous boric acid solution to surfaces of porous adsorbent base,
removing water from the boric acid solution, and
forming boron oxide at the surfaces from the boric acid.

10. The boron oxide-containing adsorbent of claim 9, the method further comprising:
removing an amount of water from the boric acid solution to leave boric acid at the surfaces, and
heating the boric acid at the surface to remove water from the boric acid and convert the boric acid to boron oxide.

11. A purifier device comprising a purifier vessel comprising an interior, an inlet, an outlet, and boron oxide-containing adsorbent of claim 1 at the interior.

* * * * *